July 10, 1951  H. S. HORN  2,560,110
TEMPORARY BINDER
Filed Sept. 12, 1945
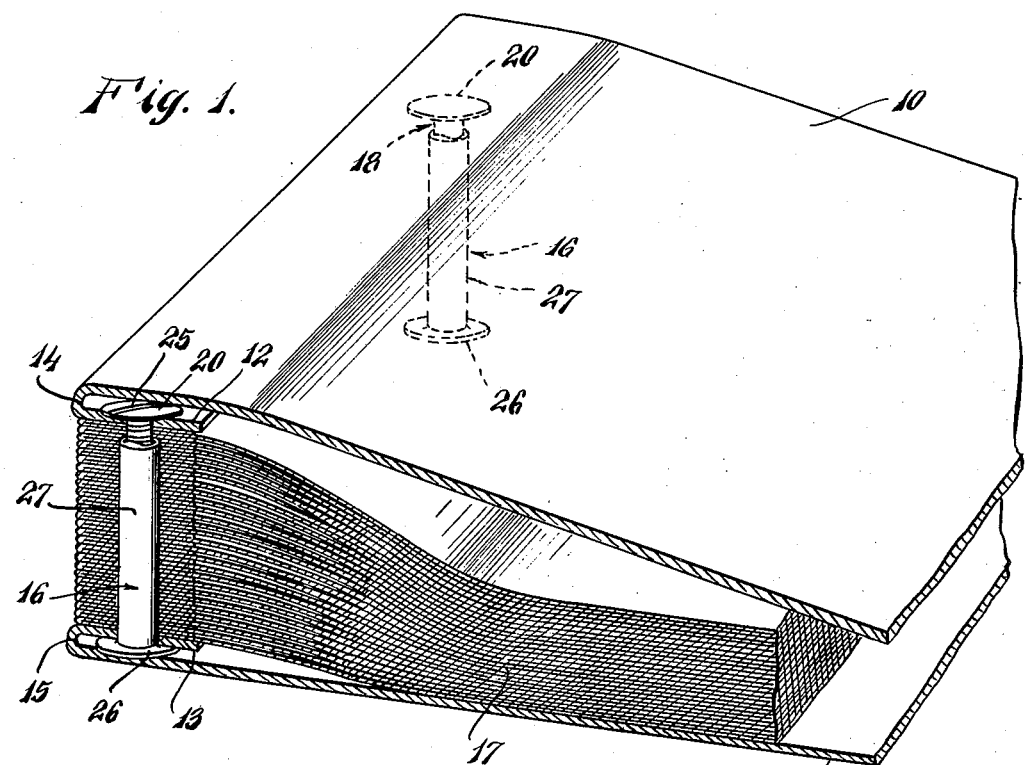
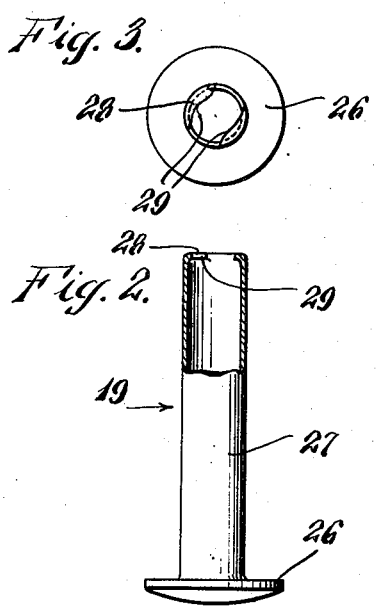
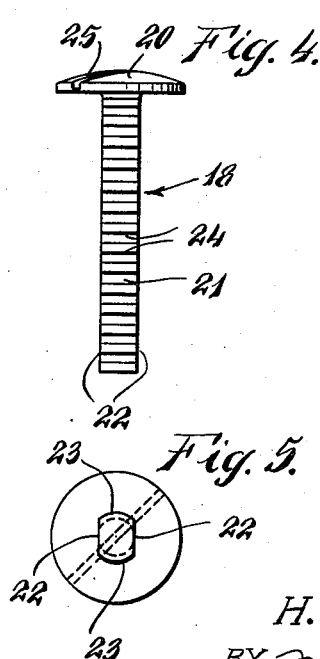
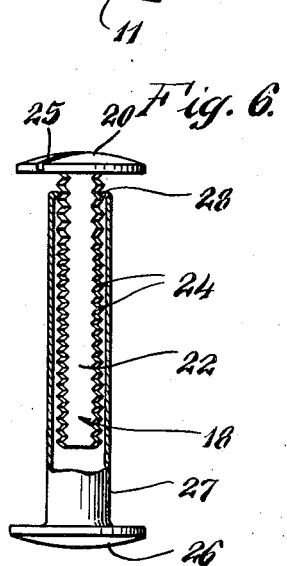
INVENTOR
H. Stanley Horn
BY *Fraser Myers Manley*
ATTORNEYS Patented July 10, 1951

2,560,110

UNITED STATES PATENT OFFICE 2,560,110

TEMPORARY BINDER

Henry Stanley Horn, South Orange, N. J., assignor to W. C. Horn Bro. & Co., Newark, N. J., a corporation of New Jersey Application September 12, 1945, Serial No. 615,774

2 Claims. (Cl. 129—13)

My present invention relates to temporary binders, and more particularly to the fastening means or locking posts for securing the perforated sheets or pages to be held in such binder in assembled or book-like relation.

Among the objects of my invention are (1) to provide fastening means for a temporary binder or the like which can be made more cheaply than the fastening means heretofore used; (2) to provide such fastening means which will be highly efficient in use; and (3) to provide such fastening means which will not require the use of any special tools for their manipulation.

The foregoing and other objects of my invention not specifically recited, I accomplish by forming the fastening means as a pair of cooperating elements one of which is a headed post, the stud or shank of which has opposite flat faces which are flanked by mutilated threaded or serrated portions and the other element of which is a headed tubular member the inner end of which is formed with inturned lips or cams so dimensioned as to freely move longitudinally over the shank of the post and being adapted to lock onto the mutilated screw-threads or serrations on the shank upon said elements being rotated relatively to one another through an arc of approximately 90°. The invention will be better understood from the detailed description which follows, when considered in connection with the accompanying drawings showing a preferred embodiment of my invention, and wherein:

Figure 1 is a sectional perspective view of a temporary binder embodying my invention.

Fig. 2 is an elevation, with parts broken away, of the tubular element forming part of the fastening means.

Fig. 3 is a plan view of the tubular element shown in Fig. 2.

Fig. 4 is a side elevation of the post element forming part of the fastening means.

Fig. 5 is a plan view of the post shown in Fig. 4.

Fig. 6 is a side elevation, with parts broken away, of the fastening means in locking relation.

Referring to the drawings, the temporary binder therein illustrated consists of a pair of cover members 10 and 11 formed of any suitable semi-flexible material, the cover member 10 being formed with an inturned overlapped flange 12 and the cover member 11 being formed with an inturned overlapped flange 13, the flanges being connected by hinged portions 14 and 15, respectively, to the covers. Mounted between the covers of the binder and secured between the flanges thereof by fastening means, indicated generally by the reference character 16, are a plurality of sheets 17 of perforated material, the fastening elements passing through the perforations in said sheets.

The fastening means 16, two of which are shown for securing the perforated sheets in assembled relation between the covers, each consists of two telescoping elements 18 and 19 which are adapted for limited rotation relatively to one another. The element 18 has an enlarged head 20 and an axially extending post or shank 21, the shank having opposite flat faces 22 which flank intermediate partially cylindrical surfaces 23 provided with transversely extending screw-thread-like grooves or serrations 24. The length of the shank 21 is somewhat less than the normally combined thickness of the stack of perforated sheets 17 and the flanges 12 and 13, for a reason which will presently appear. For rotating the element 18 the head 20 thereon may be formed with a kerf or slot 25 for accommodating a screw-driver, the edge portion of a thin coin or the like. The element 19 also has an enlarged head 26 and a tubular portion 27 of an interior diameter to engage over the shank 18, the inner end of the tubular member being formed with a pair of diametrically opposed radial inwardly directed lips 28 of a thickness to engage within the grooves 24 of the shank, the inner edges of the lips defining curves 29 having progressively decreasing radii, the smallest diametrical distance between the lips being less than the diameter of the shank 18. The length of the tubular portion 27 is also less than the combined thickness of the stack of sheets and cover flanges so that when the elements 18 and 19 are mounted in telescopic relation through the cover flanges and the perforations in the sheets the inner ends of the respective elements 18 and 19 will not abut against the cover flanges.

The element 18 can be cheaply made from any suitable metal by forging or die-casting, or from plastic material by a moulding process. The element 19 can be made from any suitable metal by a tube or shell forming operation, after which the end of the shell may be punched out to provide the inturned lips 28. The element 19 may likewise be formed of plastic material.

In assembling the temporary binder, the stack of sheets 17 are positioned between the flanges 12 and 13, and the elements 18 and 19 constituting the fastening means are inserted through the respective flanges 14 and 15 and through the perforations in the sheets. When the fastening elements reach the limit of their insertion, a quarter turn in the proper direction imparted to one of the elements with respect to the other will operate to cause the edges 29 of the lips 28 to ride within the grooves 24 and cam upon said grooves so as to lock the elements against accidental separation. Such rotation may be imparted to the rotatable element by a screwdriver or the edge of a coin inserted in the kerf 25. In view of the fact that the smallest diametrical distance between the innermost projecting portions of the lips 29 is less than the diameter of the stud measured across the partially cylindrical surfaces thereof, it will be apparent that as the elements are rotated relatively to each other to an arc of approximately 90°, the lips will engage in the grooves in the stud and bind therewith. It will also be appreciated that because of the limitations defined in the preceding sentence, rotation of the elements to lock them in assembled relation can not proceed beyond 90°. To separate the fastening elements for the purpose of inserting additional sheets or removing sheets from the binder, it is merely necessary to rotate the elements in reverse direction to unlock them, whereupon they may be separated by a relative axial movement therebetween.

While I have shown and described a preferred embodiment of my invention it will be understood that changes may be made therein within the range of mechanical skill without departing from the spirit of my invention as defined in the appended claims.

What I claim is:

1. Fastening means for securing together a plurality of sheets of perforated material, said fastening means comprising two cooperating elements, one surrounding and adapted to be moved axially relative to the other and to lock onto the other, one element being a post having opposite longitudinally extending parallel flat portions which flank partial cylindrical portions forming transversely extending arcuate serrations having the same radii, and the other element having an internally smooth tubular portion of somewhat larger internal diameter than the partial cylindrical portions of the post, the inner end of the tubular portions having diametrically opposed inwardly projecting lips lying in a plane at a right angle to the axis of the tubular member, the inner edges of said lips defining curves having different radii, the smallest diametrical distance between the innermost projecting portions of the lips being less than the diametrical distance across the bases of the serrations but larger than the dimension of the post between the opposite flat portions whereby to permit the lipped end of the tubular portion to be passed over the post so that, upon rotation of the elements relatively to one another through an arc of approximately 90°, the lips will cam upon the bases of the serrations to lock the elements against accidental axial movement.

2. In a temporary binder or the like comprising a pair of cover members each having an inturned overlapped flange, a plurality of perforated sheets between the flanges and fastening means extending through the flanges and through the perforations in the sheets to hold them in assembled relation, said fastening means comprising two telescoping elements which are adapted for limited rotation relatively to one another, one of said elements having an enlarged head, disposed between one of said flanges and its cover, and an axially extending stud of less length than the normal thickness of the binder, said stud having parallel opposite flat portions and intermediate partial cylindrical surfaces provided with transversely extending screw-thread-like grooves and the other element having an enlarged head disposed between the other flange and its cover, and an axially extending tubular portion of less length than the normal thickness of the binder and of an internal diameter larger than the diameter of the stud element, said tubular portion having only at its inner end diametrically opposed radial inwardly projecting lips of a thickness to engage within the grooves of the stud, the inner edges of the lips defining curves having progressively decreasing radii, the smallest diametrical distance between the edges of the lips being less than the diameter of the stud across the bases of its grooves, but larger than the dimension of the post between the parallel opposite flat portions thereof, whereby to permit the lipped end of the tubular portion to engage over the post so that by rotation of the elements relatively to each other through an arc of approximately 90°, the lips will engage in the grooves in the stud and cam and lock therewith to hold the elements against accidental axial movement.

H. STANLEY HORN.

REFERENCES CITED

The following references are of record in the file of this patent:

UNITED STATES PATENTS

| Number | Name | Date |
|---|---|---|
| 566,130 | Bowers | Aug. 18, 1906 |
| 1,052,179 | Robley | Feb. 4, 1913 |
| 1,555,070 | Parker | Sept. 29, 1925 |
| 2,244,976 | Tinnerman | June 10, 1941 |
| 2,283,122 | Murphy | May 12, 1942 |
| 2,424,037 | Jenkins | July 15, 1947 |

FOREIGN PATENTS

| Number | Country | Date |
|---|---|---|
| 22,399 | Great Britain | Nov. 12, 1914 |
| 668,843 | Germany | Dec. 13, 1938 |